United States Patent [19]

Hayashi

[11] Patent Number: 4,816,925
[45] Date of Patent: Mar. 28, 1989

[54] IMAGE INFORMATION PROCESSING APPARATUS FOR DISPLAYING IMAGE INFORMATION OBTAINED BY SCANNING AN ORIGINAL DOCUMENT OR RETRIEVED FROM AN OPTICAL DISC MEMORY

[75] Inventor: Yasushi Hayashi, Kawasaki, Japan

[73] Assignee: Kabushiki Kaisha Toshiba, Kawasaki, Japan

[21] Appl. No.: 26,103

[22] Filed: Mar. 16, 1987

[30] Foreign Application Priority Data

May 20, 1986 [JP] Japan ................................ 61-115596
May 20, 1986 [JP] Japan ................................ 61-115597

[51] Int. Cl.$^4$ ................................................ G11B 7/00
[52] U.S. Cl. ................................... 358/342; 340/727; 364/521
[58] Field of Search ............... 358/102, 335, 342, 903; 364/521, 518, 522; 340/727

[56] References Cited

U.S. PATENT DOCUMENTS

4,554,638 11/1985 Iida ....................................... 364/521

Primary Examiner—Robert L. Richardson
Attorney, Agent, or Firm—Oblon, Fisher, Spivak, McClelland & Maier

[57] ABSTRACT

A document filing apparatus for storing and retrieving image information derived from an original document on and from an optical disc memory, which has a two-dimensional scanner for reading out the image, an optical disc drive for storing the image information on the optical disc memory and a display for displaying the image scanned by the scanner or retrieved from the optical disc memory laterally or longitudinally on a screen in dependance on the size of the document from which the image was derived.

5 Claims, 7 Drawing Sheets

IMAGE INFORMATION PROCESSING APPARATUS FOR DISPLAYING IMAGE INFORMATION OBTAINED BY SCANNING AN ORIGINAL DOCUMENT OR RETRIEVED FROM AN OPTICAL DISC MEMORY

BACKGROUND OF THE INVENTION

1. Field of the Invention

The present invention relates to an image information processing apparatus which is adapted for storing and retrieving image information by using an optical disc memory. More specifically, the invention relates to an image information processing apparatus which is capable of displaying image information obtained by scanning an original document or retrieved from the optical disc memory.

2. Discussion of Background

A document filing apparatus is used for storing and retrieving image information of an original document on and from an optical disc memory. In the document filing apparatus of the type described above, image information on documents is read by a two-dimensional scanner and such image information is stored on the optical disc memory. The apparatus is provided with an ultra high resolution display device using a cathode ray tube. The document is scanned by the scanner and the scanned image is transferred to the CRT display and corresponding image information obtained from the scanning is stored on the optical disc memory. Desired image information is retrieved as needed and displayed by the CRT display.

The above-mentioned apparatus, regardless of the size of document to be read out by the scanner, displays image information obtained from the scanner or optical disc memory onto a longitudinal display area (1,792 dots ×2,400 dots) of the CRT display. In many cases, documents equal to or greater than a B4 size are used laterally, and those equal to or smaller than A4 size are used longitudinally. During initial display operation, however, all kinds of documents are displayed longitudinally, regardless of the document size.

However, an image laterally recorded on a B4 size document is displayed longitudinally, which prevents difficulty in viewing the image.

To solve the above problem, U.S. Pat. No. 4,520,399 discloses a picture information display having a control circuit for determining a reductive ratio to convert the image to be displayed on a display area in correspondance with the size of an original. Such a display, however, may not effectively utilize the display area.

SUMMARY OF THE INVENTION

Accordingly, it is an object of the present invention to provide an improved image information processing apparatus which effectively utilizes a display area for image information.

It is another object of the present invention to provide an image information processing apparatus in which the displaying of image information is simplified.

It is still another object of the present invention to provide an image information processing apparatus in which image information recorded on original documents is displayed in accordance with the document size.

In accordance with the present invention, the foregoing objects and others are achieved by providing an image information processing apparatus including means for reading image information on an original document, means for displaying the image information read by the reading means on a display area, and means for locating the image information onto the display area in a predetermined direction corresponding to the size of the original document, so that the displaying means displays the image longitudinally or laterally in accordance with the size of the original document carrying the image information thereof.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

Figure 1:
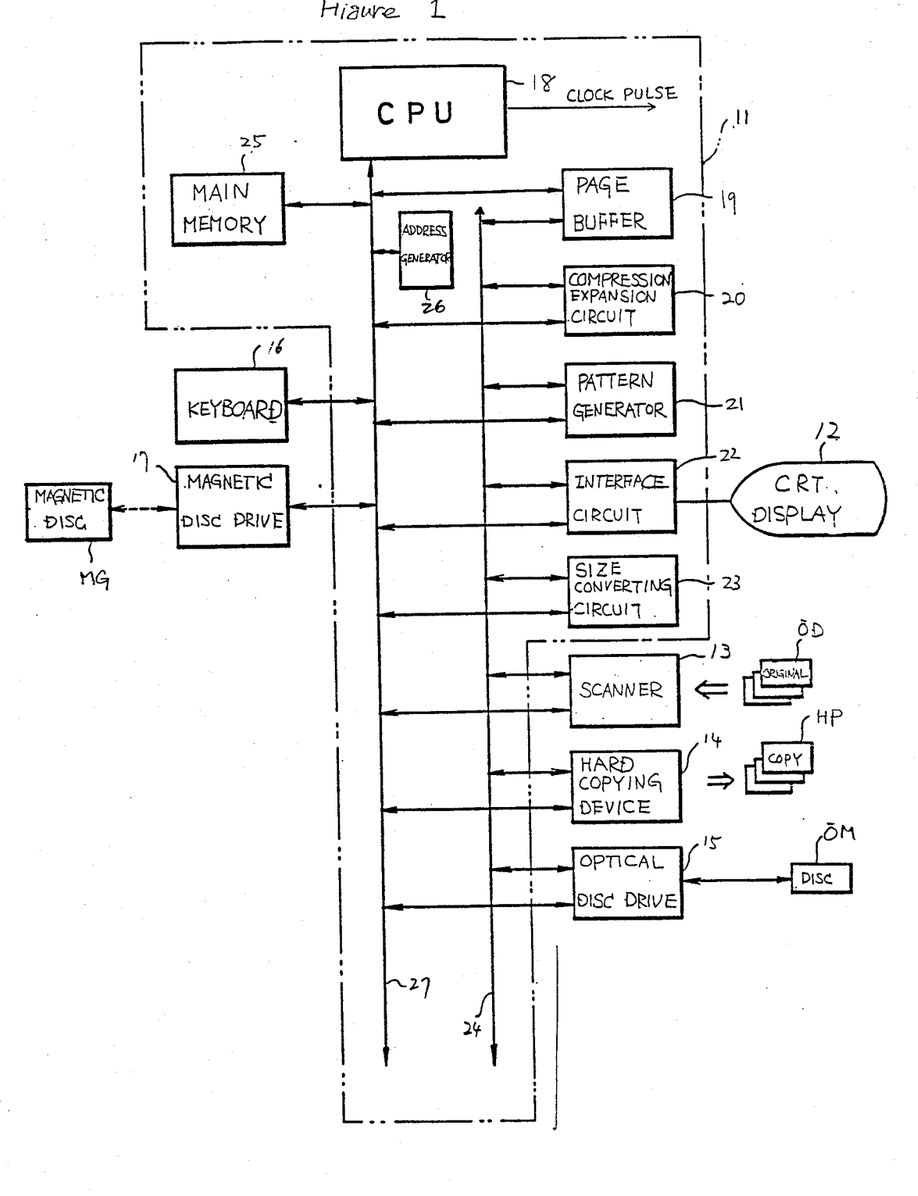
FIG. 1 is a schematic block diagram of an image information processing apparatus applied to an image information storing and retrieving apparatus with an optical disc memory according to the present invention.
Figure 2:
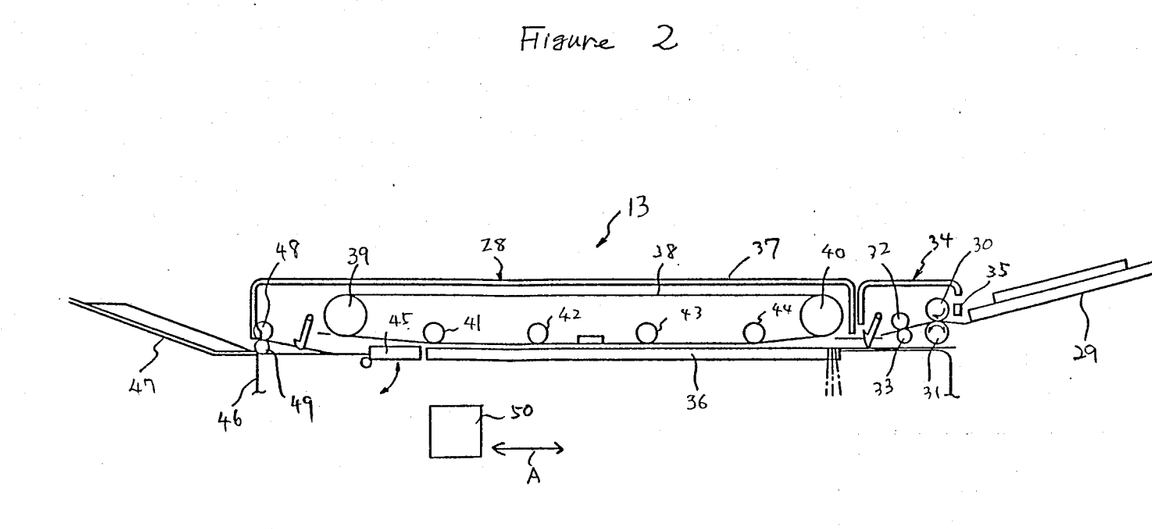
FIG. 2 is a schematic diagram of a two-dimensional scanner shown in FIG. 1.

Referring now to the drawings, where like reference numerals refer to like or corresponding parts throughout to several views, in FIGS. 1, 2 and 2, there is shown an image information processing apparatus applied to an image information storing and retrieving apparatus having an optical disc memory according to the present invention. The image information processing apparatus has a main controller 11, a CRT display 12, a two-dimensional scanner 13, a hard copying device 14, an optical disc drive 15, a keyboard 16 and a magnetic disc drive 17. Main controller 11 includes a CPU 18 which may perform various control operations for storing and retrieving image information. A page buffer memory 19 is connected to a compression/expansion circuit 20, a pattern generator 21, an interface circuit 22 and a size converting circuit 23 via an image bus 24 within main controller 11. Page buffer 19 has a memory area corresponding to at least one unit of image information, i.e., one page of image information on an A1 size original document, and temporarily stores the image information therein. Compression/expansion circuit 20 performs a signal compressing and expanding operation based on the MH (Modified Hoffman) conversion or inverse conversion. Pattern generator 21 has predetermined data representing pattern information such as characters and signs. Interface circuit 22 is connected to CRT display 12 so that the image information provided through image bus 24 is displayed on the screen of CRT 12. Size converting circuit 23 is provided with predetermined size conversion ratio data and reduces the image information to a predetermined size so as to adapt the image for CRT display 12. CPU 18 is connected to page buffer 19, compression/expansion circuit 20, pattern generator 21, interface circuit 22, size converting circuit 23, a main memory 25 and an address generator 26 via a data bus 27 within main controller 11. Main memory 25 stores various programs for executing image storing/retrieving operations, management information, etc. Address generator 26 generates address data corresponding to data writing/reading operations for the above-mentioned devices. CPU 18 provides clock pulse signals to the above-mentioned components.

Two-dimensional scanner 13 is connected to CPU 18 through image bus 24 and data bus 27. Scanner 13 performs two-dimensional scanning of original documents OD ranging from an A5 to A1 size to obtain a video signal corresponding to image information on documents OD. Hard copying apparatus 14 is connected to CPU 18 through image bus 24 and data bus 27. This apparatus 14 reproduces a hard copy HP of image information obtained from scanner 13 or read out from optical disc drive 15. Optical disc drive 15, a large capacity storage device, is connected to CPU 18 through image bus 24 and data bus 27, and sequentially stores image information obtained from scanner 13 in an optical disc memory OM. Keyboard 16 is connected to CPU 18 via data bus 27 and is used to enter various operating instructions and title information for individually indentifying image information to be stored or retrieved. Magnetic disc drive 17 is connected to CPU 18 via data bus 27 and stores retrieval data corresponding to the document information in a magnetic disc MG.

Two-dimensional scanner 13 has a document feeder 28. Originals supported on a feed tray 29 are fed by rollers 30, 31, 32 and 33 in a feed section 34. Rollers 30 and 31 separate the documents on tray 29 into separate sheets so that the original document is fed one by one by feed rollers 32 and 33. A photodetector 35 is located between separating rollers 30 and 31 and tray 29 to detect the originals supported on tray 29. The original fed from feed section 34 is placed on an original table 36 in a conveyor section 37. Conveyor section 37 has a conveyor belt 38 provided on rollers 39-44 to locate the original fed from feed section 34 at the predetermined position. The original is fed along the surface of original table 36 by holding it between conveyor belt 38 and original table 36, and then positioned by a stopper 45. Stopper 45 is rotatably provided on a main body 46 so as to engage the original and permit it to pass through in accordance with the rotational position of stopper 45. After the scanning operation, the original on original table 36 is then discharged onto a discharge tray 47 by means of discharge rollers 48 and 49.

Main body 46 is provided with an optical unit 50 under original table 36. Optical unit 50 has an exposure lamp, a lens and a CCD line sensor (not shown). Light from the exposure lamp is projected onto the original. Reflected light from the original is incident on the surface of the CCD line sensor through the lens. The line sensor produces an image signal corresponding to image information on the original with a resolution of 8 pixel/mm and 7.7 pixel/mm. Optical unit 50 reciprocates in the direction of the arrow A to perform optical scanning of the original on a line-by-line basis. The originals set on tray 29 are detected by photodetector 35 so as to produce a control signal.

CPU 18 activates rollers 30 and 31 to separate the originals into individual sheets. The separated original is fed by rollers 32 and 33, and then conveyed onto original table 36 by conveyor belt 38. The original is then positioned by stopper 45. At this point, optical unit 50 reciprocates to scan the original supported on original table 36. After that, the original is discharged onto discharge tray 47.

Figure 3:
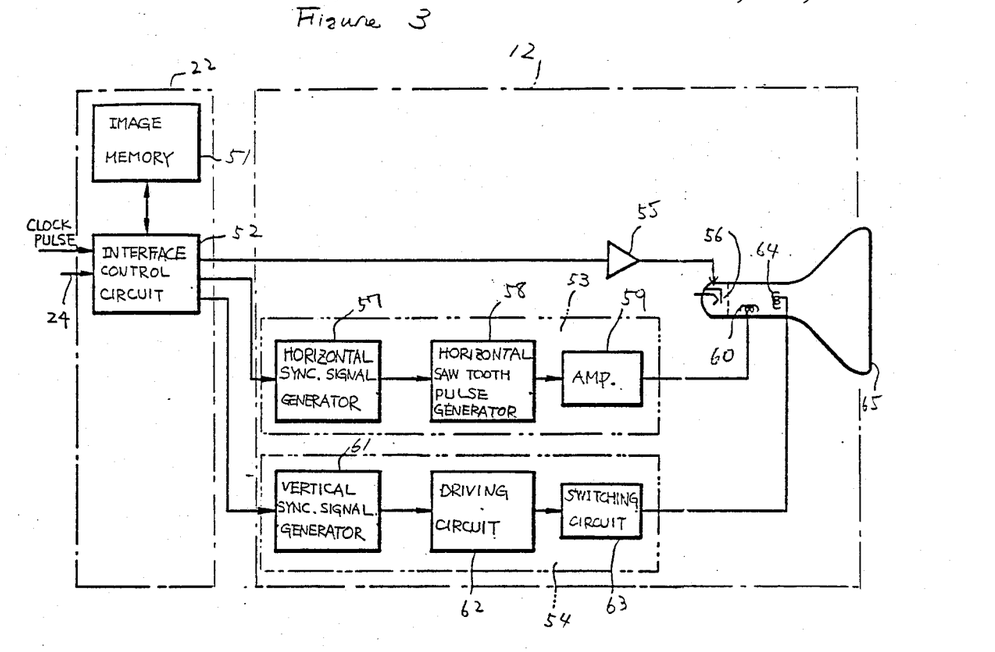
FIG. 3 is a schematic block diagram showing a display device shown in FIG. 1.
Figure 4:
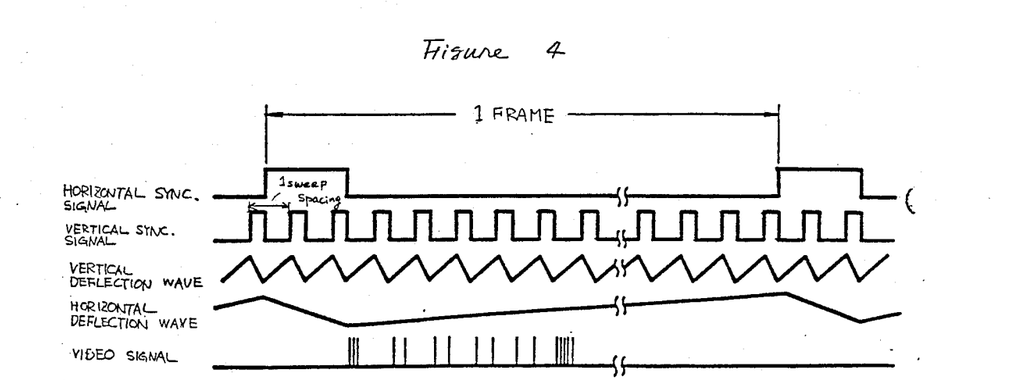
FIG. 4 is a timing diagram useful for explaining the operation of the display device.

FIG. 3 shows a detailed circuit construction of the CRT display 12 including the interface circuit 22. Interface circuit 22 has an image memory 51 and an interface control circuit 52. CRT display 12 has a horizontal deflecting circuit 53 and a vertical deflecting circuit 54. Image memory 51 stores video signals output from size converting circuit 23 through image bus 24. The video signals stored in image memory 51 are fed through interface control circuit 52 to an amplifier 55. Then, the video signals amplified by amplifier 55, as shown in FIG. 4, are fed to the cathode 56 in CRT display 12 so as to generate electron beams in accordance with the video signals.

In FIG. 3, horizontal deflecting circuit 53 has a horizontal sync. signal generator 57, a horizontal saw tooth pulse generator 58, and an amplifier 59. Clock pulse signals are output from CPU 18. The clock pulse signals are fed to interface control circuit 52 so as to generate synchronizing signals which are fed to each of deflecting circuits 53 and 54. Horizontal sync. signal generator 57 generates horizontal sync. signals representing 1 frame period as shown in FIG. 4 in accordance with the synchronizing signals. The generated horizontal sync. signals have a low frequency of about 66 Hz. The generated horizontal sync. signals are fed to horizontal saw tooth pulse generator 58 so as to form horizontal deflection waves as shown in FIG. 4. The horizontal deflection waves are fed to a horizontal deflecting yoke 60 through amplifier 59. By applying deflection waves to yoke 60, a magnetic field is produced so that horizontal deflection control on the electron beams in CRT display 12 may be performed.

Vertical deflecting circuit 54 has a vertical sync. signal generator 61, a driving circuit 62 and a switching circuit 63. Generator 61 produces vertical sync. signals, as shown in FIG. 4, in accordance with the synchronizing signals. The produced vertical sync. signals represent 1 sweep spacing period and have a high frequency of 165KHz. The produced vertical sync. signals are fed to driving circuit 62 and switching circuit 63 so as to form vertical deflecting waves as shown in FIG. 4. By applying deflecting waves to yoke 64, a magnetic field is produced so that vertical deflection control on the electron beams in CRT display 12 may be performed.

Figure 5:
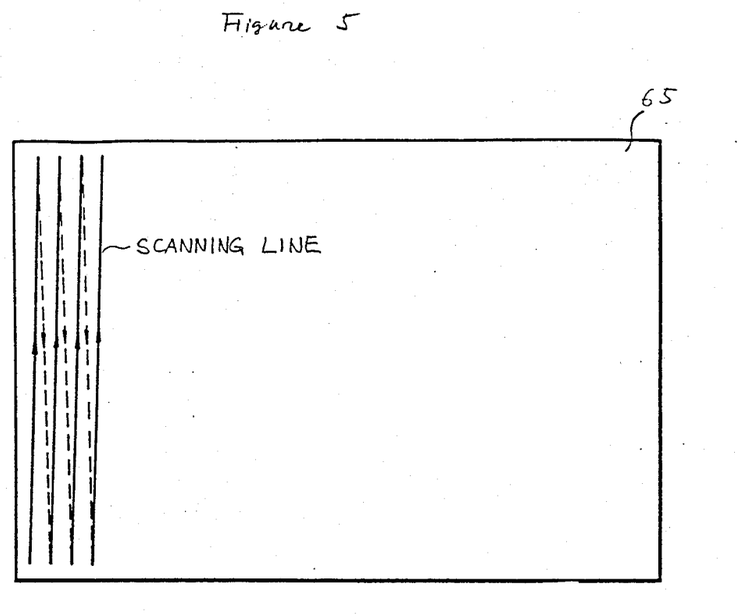
FIG. 5 is an illustration of the sweep operation of the display device and is useful for explaining scanning lines of the display area.
Figure 6:
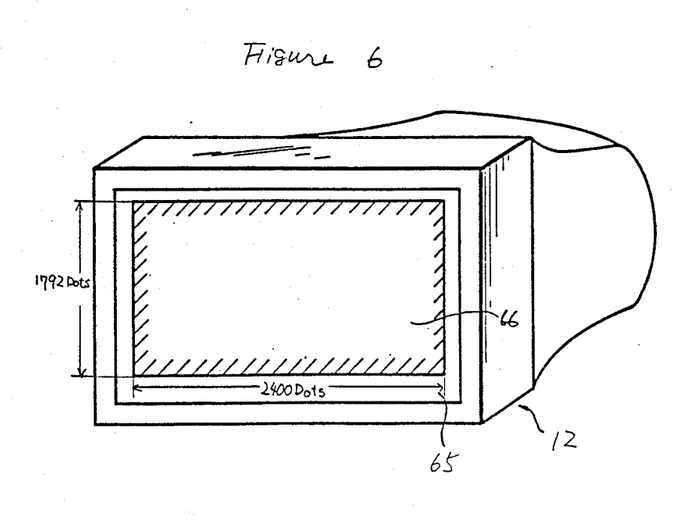
FIG. 6 is a perspective view of the display device.
Figure 7:
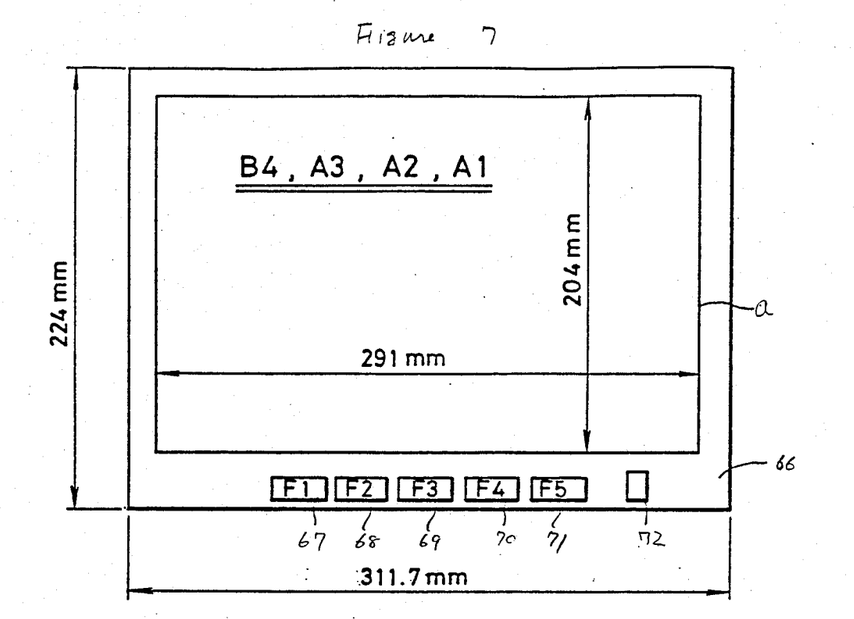
FIG. 7 is an example of the lateral display of an image on the display area.
Figure 8:
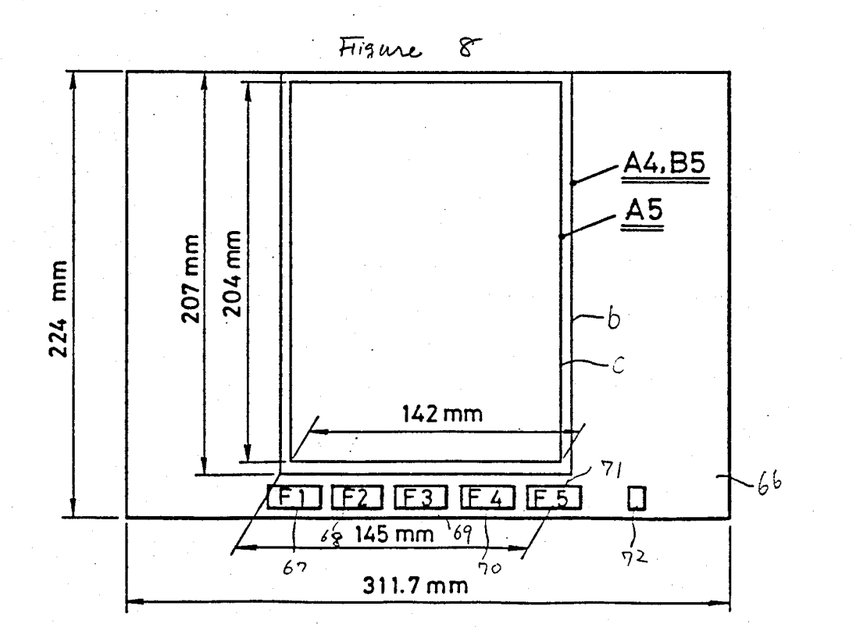
FIG. 8 is an example of the longitudinal display of an image on the display area.

Thus, the video signals from image bus 24 are fed to interface circuit 22 and then the image corresponding to the video signals may be displayed on a lateral display screen 65 of CRT display 12. CRT display 12 may have 2400 scanning lines scanned in the vertical direction on lateral display screen 65 as shown in FIG. 5. Display screen has a display area 66 of 224 mm×311.7 mm which is comprised of a 1792 ×2400 matrix of display dots as shown in FIG. 6. At the initial displaying, an image corresponding to an original document of B4, A3, A2 or A1 size is laterally displayed within a lateral location a of 204 mm×291 mm on display area 66, as shown in FIG. 7. Also, an image corresponding to an original document of A4 or B5 size is longitudinally displayed within a longitudinally location b of 207 mm×145 mm on display area 66. An image corresponding to an original document of A5 size is longitudinally displayed within a longitudinal location c of 204 mm×142 mm on display area 66, as shown in FIG. 8. Thus, during the initial displaying stage, a document equal to or greater than the B4 size is displayed laterally, and a document equal to or smaller than the A4 size is displayed longitudinally.

As shown in FIG. 7 and 8, on display area 66, there are presented guide portions 67, 68, 69, 70 and 71 indicating the operating mode of function keys (not shown). The function keys are used for designating an operation mode such as, F1: Retrieval Mode; F2: Registration Mode; F3: Deletion Mode; F4: Optical Disc Set/Removal Mode; and F5: Others. Display area 66 has a display portion 72 indicating the document size and the resolution for displaying operation.

Magnetic disc drive 17 stores on magnetic disc MG retrieval data including a search code designated by keyboard 16, the size of image information corresponding to the search code and the address data indicating a recording address on the optical disc OM where the image information is stored. Also, magnetic disc MG has data indicating the resolution of CRT display 12, scanner 13 and hard copying device 14. For example, each of CRT display 12 and scanner 13 has a resolution of 7.7 pixel/mm×8 pixel/mm, and hard copying device 14 has a resolution of 200 pixel/inch×200 pixel/inch. Further, magnetic disc MG has data indicating the size conversion ratio between the document size and the image size to be displayed. The conversion ratio applied to each of documents A1, A2, A3, A4, A5, B4 and B5 is 0.351, 0.480, 0.703, 1, 1, 0.812 and 1, respectively. If the resolution of scanner 13 is 16 pixel/mm, the conversion ratio is reduced to one half of the ratio mentioned above.

Figure 10:
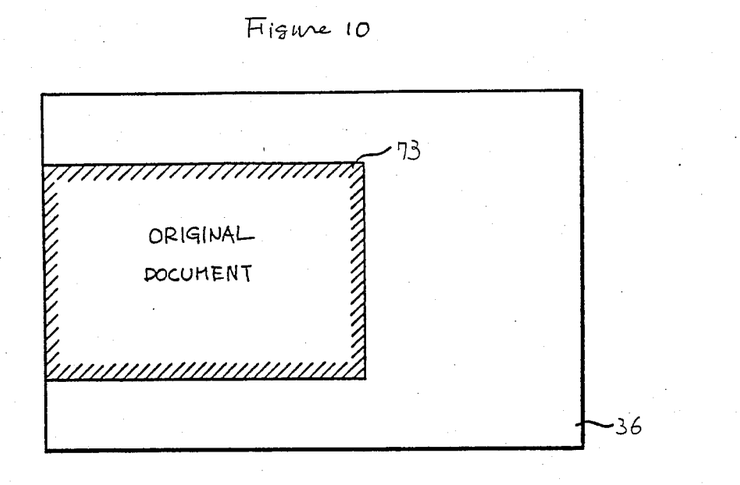
FIG. 10 is a view for explaining the set document on the two-dimensional scanner.
Figure 11:
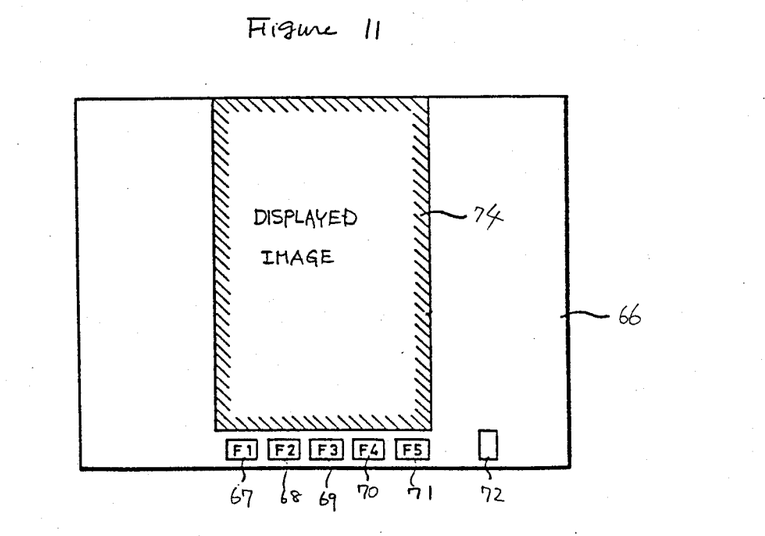
FIG. 11 is a view for explaining the displayed image on the display area.

An A4 size original document 73 is set laterally on original table 36 face down as shown in FIG. 10. At the initial displaying stage, a displayed picture 74 corresponding to original document 73 is located longitudinally on display area 66 as shown in FIG. 11. In that case, size converting circuit 23 extends the resolution of the shorter side of document 73 set on original table 36 from 7.7 pixel/mm to 8 pixel/mm and also reduces the resolution of its longer side from 8 pixel/mm to 7.7 pixel/mm for CRT display 12. Thus, if the scanner resolution and the display resolution are different from each other, the ratio of the longitudinal and lateral sides to each other are maintained constant. Not only during the initial displaying stage but also when displayed picture 74 is rotated by 90 or 270°, picture 74 is reduced or extended by the conversion ratio in accordance with the difference of resolution between scanner 13 and CRT display 12.

In the image information storing and retrieving apparatus, document 73 is set on feed tray 29 to read out image information recorded on document 73. First, the registration mode is designated by depressing the function key F2 of keyboard 16. An operator enters the search code corresponding to image information of the document 73 to be stored. Then, CPU 18 checks the validity of input data with a predefined search code format upon digit count and character types. The input code, if it has been proven to be correct, is stored in main memory 25.

Figure 9:
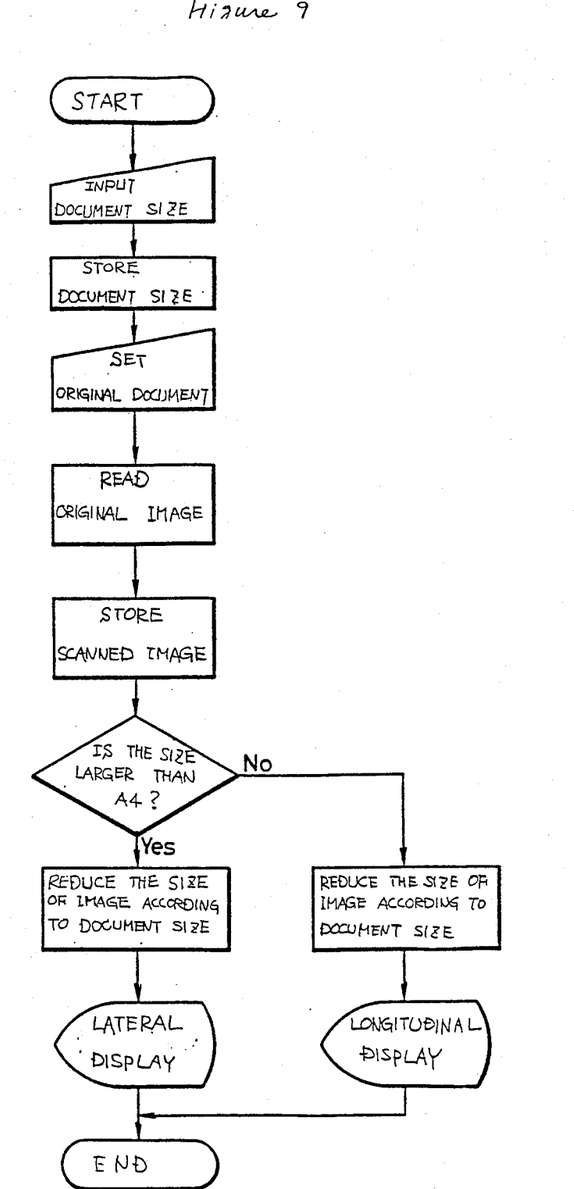
FIG. 9 is a flow chart useful for explaining the displaying operation of the display device.

Referring now to FIG. 9, the operator designates a document size by depressing keyboard 16. Thus, scanner 13 is operative to initiate a scanning operation. Photodetector 35 detects document 73 set on feed tray 29 so as to drive rollers 30-33 and conveyor belt 38. Document 73 is fed to the original table 36 by feed section 34 and conveyor section 37. Stopper 45 is positioned to engage document 73 so that document 73 is located at the predetermined position as shown in FIG. 10. Then, optical unit 50 moves along document 73 to read out image information therefrom. After that, conveyor section 37 is activated to discharge document 73 onto tray 47.

Responding to input data indicating the document size, CPU 18 stores the data representing the document size and the resolution in accordance with scanning resolution in main memory 25. Scanned image information is sequentially transferred to page buffer 19. The storage area in page buffer 19 corresponds to the document size input from keyboard 16. Thus, the image information corresponding to one page of original document 73 is stored in page buffer 19. CPU 18 determines the displaying mode for the scanned image in response to the document size. When the document size is greater than A4, size converting circuit 23 reduces the scanned image stored in page buffer 19 by the reduction ratio corresponding to the document size and the displaying mode, and the reduced image data is transferred to image memory 51. At this time, CPU 18 designates the lateral display mode according to the document size. When the document size is equal to or smaller than A4, size converting circuit 23 reduces the scanned image stored in page buffer 19 by the reduction ratio corresponding to the document size. The reduced image data is transferred to image memory 51. In this case, CPU 18 designates the longitudinal display mode according to the document size. Thus, the image information stored in image memory 51 is fed to CRT display 12 to display picture 74 on display screen 65 in response to the display mode.

For example, when the document to be scanned is an A3 size, the operator enters the document size, "A3", through keyboard 16 and sets the document on original table 36 or feed tray 29. CPU 18 stores in main memory 25 the document size data entered through keyboard 16 and the resolution data corresponding to the scanning density of scanner 13 in conjunction with the search code. Then, the image of the original document is optically scanned so that the scanned image is stored in page buffer memory 19. When one page of image information has been stored in page buffer memory 19, CPU 18 detects the document size to be greater than the A4 size in accordance with the size data stored in main memory 25 to perform lateral initial display. CPU 18 transfers the image information reduced by a size conversion ratio of 0.703 both longitudinally and laterally by size converting circuit 23 from page buffer memory 19 to interface circuit 22. The image information stored in image memory 51 is displayed laterally on display area 66 of CRT display 12. As shown in FIG. 7, the image of the A3 size document is displayed within lateral location a of display area 66 so as to efficiently utilize display area 66. When a reversed image is displayed on screen 65, a reversion key (not shown) may be utilized to rotate the displayed image on area 66.

Also, an A1, A2 or B4 size document may be scanned and displayed in the same manner as for the A3 size document mentioned above, except that the reduction ratio changes to 0.351, 0.480 and 0.812, respectively.

When the A4 size document is scanned, the operator enters the document size, "A4", through keyboard 16 and locates the document on original table 36 or feed tray 29. CPU 18 stores in main memory 25 the document size data entered through keyboard 16 and the resolution data corresponding to the scanning density of scanner 13 in conjunction with the search code. Then, the image on the original document is optically scanned so that the image read out by scanner 13 is stored into page buffer 19. When one page of image information has been stored in page buffer memory 19, CPU 18 detects the document size in accordance with the size data stored in main memory 25 to perform longitudinal initial display. CPU 18 enlarges the longitudinal side of the image information stored in page buffer memory 19 by a ratio of 1.04 and reduces its lateral side by a ratio of 0.96 by using size converting circuit 23. The size converted image information is transferred to image memory 51, and then displayed longitudinally on display area 66 of CRT display 12. As shown in FIG. 8, the image of the A4 size document is displayed within longitudinal location b. Thus, the image of the A4 size document is displayed longitudinally on display area 66.

Also, image information on a B5 or A5 size document may be scanned and displayed in the same manner as for the A4 size document except that the image of the A5 size document is displayed on display location c. As is mentioned above, rotation of image location may be specified by using the reversion key.

After that, the operator confirms if a satisfactory image has been displayed on CRT display 12 and then depresses a recording key (not shown) to execute a filing operation. CPU 18 band-compresses, by the conventional MH (Modified Hoffman) conversion at compression/expansion circuit 20, image information of one page stored in page buffer 19 one scanning line after another, and supplies the compressed line data to optical disc drive 15. Optical disc drive 15 records the supplied picture information on optical disc OM. After recording the image, main memory 25 stores a recording address including a track number where the image information has been stored, a starting sector for recording, and a record length in conjunction with the search code. Then, CPU 18 feeds to magnetic disc drive 17 the search data stored in main memory 25 having the search code, track number and record length. Magnetic disc drive 17 stores the supplied data on magnetic disc MG.

When a retrieval operation is performed, the operator operates keyboard 16 to designate the retrieval mode and enters a search code corresponding to the image information to be retrieved. CPU 18 sequentially compares the input search code with those stored in magnetic disc MG. If there is a coincident search code, the starting track and starting sector number representing recording address, document size and resolution of the recorded image are stored into main memory 25. CPU 18 controls optical disc drive 15 to reproduce the image recorded on the designated tracks of optical disk OM. The reproduced image data are transferred to compression/expansion circuit 20 one scanning line after another. The expanded line image information is then in stored page buffer 19. When the reproduced picture information corresponding to one page of the original document is stored in page buffer 19, the image information is fed to image memory 51. In some cases, a hard copy HP corresponding to the reproduced image may be obtained from hard copying device 14.

As is described above, CPU 18 judges the document size data stored in main memory 25. If the document size is greater than A4, the image information stored in page buffer 19 is reduced to the predetermined display size in conjunction with the size conversion ratio corresponding to the relationship between the detected document size and display location. The size converted data are output to image memory 51 so that the image of a document having a size greater than A4 is displayed laterally and the image of that equal to or smaller than A4 is displayed longitudinally.

When hard copying device 14 reproduces copy HP, CPU 18 outputs to hard copying device 14 the image information reduced or enlarged by size converting circuit 23 responding to the conversion ratio determined by the difference between the resolution of the retrieved image and that of device 14. For example, if the resolution of the retrieved image is 8 pixel/mm×7.7 pixel/mm and that of device 14 is 200 pixel/inch ×200 pixel/inch, CPU 18 stores in page buffer 19 the image information enlarged laterally by a ratio of 1.02 and reduced longitudinally by a ratio of 0.98 by using size converting circuit 23. When one page of the size-converted image information has been stored into page buffer 19, CPU 18 outputs the image information to device 14 so as to reproduce hard copy HP.

As described above, image information recorded on a document whose size is equal to or greater than B4 is displayed laterally. On the other hand, image information on a document whose size is equal to or smaller than A4 is displayed longitudinally. Hence, the image information on the document, equal to or greater than the B4 size and used laterally in many cases, is displayed laterally, and the image information on the document, equal to or smaller than A4 size and used longitudinally in many cases, is displayed longitudinally. Thus, image information is displayed corresponding to the document size during initial document display stage.

There may be constructed a remote retrieval system having a plurality of remote retrieval terminals or input-/output terminals connected to a document filing apparatus via a bus-type local area network system so as to perform longitudinal or lateral image display. In this system, a longitudinal CRT display may be utilized for longitudinal display locations and also a lateral CRT display may be utilized for lateral display locations.

While, in the preferred embodiment, a document is placed on original table 36 and the operator designates the document size by depressing keyboard 16, the document size may be detected automatically at feed section 34 or conveyor section 37. For example, an original document 73 is placed laterally on the original table as shown in FIG. 10. The placed document 73 is detected by means of photodetectors (not shown) to designate its size. The image on a document 73 is scanned and then stored in page buffer 19. CPU 19 designates the document size according to output signals of the photodetectors. As an initial display stage, the scanned image is displayed longitudinally on the display area of CRT display 12 in response to the detected size. In that case, CPU 18 changes the resolution of the longitudinal side of the document scanned by scanner 1 from 7.7 pixel/mm to 8 pixel/mm, and the resolution of the lateral side of the document from 8 pixel/mm to 7.7 pixel/mm using size converting circuit 23. The thus size-converted image information is supplied to image memory 51 and then displayed longitudinally on display area 66 of CRT display 12 as shown in FIG. 11.

The above embodiments have been described for the purpose of illustration, and various changes and modifications of the present invention are possible within the scope and modifications of the present invention. For example, the CRT display is not limited to a lateral-type CRT, and it may be a longitudinal-type CRT.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image information processing apparatus for displaying an image information, said apparatus comprising:
    image derivation means for deriving the image information from an original document and reading out the image information;
    means for displaying the image information read out by said image derivation means on a display area; and
    means for locating the image information onto the display area in a predetermined direction corresponding to the size of the original document during initial display operation, such that said displaying means displays the image longitudinally or laterally in accordance with the size of the original document from which the image information was derived.

2. An apparatus according to claim 1, wherein said displaying means has a lateral display area.

3. An image information processing apparatus for displaying an image information, said apparatus comprising:
    means for deriving the image information from an original document and reading out the image information;
    means for providing a signal representing a size of the original document;
    means for displaying the read out image information derived from said original document, comprising a cathode ray tube having a plurality of vertical scanning lines and a lateral display area;
    means for locating the image information onto the lateral display area in a predetermined direction during initial display operation, such that said displaying means displays the image information longitudinally or laterally in accordance with the size of the original document from which the image information was derived.

4. An image information processing apparatus for displaying an image information, said apparatus comprising:
    image derivation means for deriving the image information from an original document and reading out the image information;
    means for storing in an optical memory the read out information derived from said original document;
    means for displaying a selected of the image information read out by said image derivation means or stored in the optical memory by said storing means on a display area;
    means for providing a signal representing a size of the original document from which image information to be displayed was derived; and
    means for locating the image information provided from said image derivation means or from the optical memory onto the display area in a predetermined direction corresponding to the signal from said providing means during initial display operation, such that said displaying means displays the image longitudinally or laterally in accordance with the size of the original document from which the image information was derived.

5. An apparatus according to claim 4, further comprising:
    means for retrieving the image information stored in the optical memory; and
    means for reproducing a hard copy of the image information retrieved by said retrieving means.

* * * * *